United States Patent [19]

Stuart, Jr.

[11] Patent Number: 5,401,811
[45] Date of Patent: Mar. 28, 1995

[54] CONTINUOUS PROCESS FOR THE OXIDATION OF POLYETHYLENE

[75] Inventor: Richard K. Stuart, Jr., Longview, Tex.

[73] Assignee: Eastman Chemical Company, Kingsport, Tenn.

[21] Appl. No.: 237,530

[22] Filed: May 3, 1994

[51] Int. Cl.⁶ .............................................. C08F 8/06
[52] U.S. Cl. ................................ 525/388; 525/333.8
[58] Field of Search ......................................... 525/388

[56] References Cited

U.S. PATENT DOCUMENTS

| | | |
|---|---|---|
| 3,322,711 | 5/1967 | Bush et al. |
| 4,459,388 | 7/1984 | Hettche et al. ................. 525/333.8 |
| 4,889,847 | 12/1989 | Schuster et al. ................. 525/333.8 |
| 5,064,908 | 11/1991 | Schuster et al. |

*Primary Examiner*—Bernard Lipman
*Attorney, Agent, or Firm*—Mark A. Montgomery

[57] ABSTRACT

Disclosed is a process for the solid state oxidation of particulate polyethylene. This oxidation process entails continuously introducing a free radical initiator, an oxygen containing gas, and particulate polyethylene into a reactor into an agitated bed that is filled with a majority of a particulate oxidized polyethylene that acts as seed. This process dramatically reduces the residence time of the oxidation of particulate polyethylene by introducing a minor amount of fresh, unoxidized particulate polyethylene into a bed of particulate oxidized polyethylene.

21 Claims, No Drawings

1

CONTINUOUS PROCESS FOR THE OXIDATION OF POLYETHYLENE

FIELD OF THE INVENTION

The present invention relates to a continuous process for the oxidation of polyethylene. More particularly, the present invention relates to a continuous process for the oxidation of particulate polyethylene in an agitated bed reactor at reduced residence time.

BACKGROUND OF THE INVENTION

The oxidation of polyethylene to form oxidized polyethylene has been known for many years. Oxidized polyethylene is useful in the formation of emulsions that can be used in many applications, these include: components in floor care products, lubricants for polymer processing, or lubricants for textile applications, as well as various other emulsion applications, such as in leather processing, water dispersible coatings, inks and resins.

One method of oxidizing polyethylene entails the oxidation of polyethylene in the melt phase. The melt phase oxidation of polyethylene has some limits, however, requiring that the oxygen-containing gas be readily defused at high concentrations through the molten polyethylene. If the polyethylene is too viscous, the oxygen diffusion is very slow and impractical on a commercial scale. Additionally, melt oxidation in some instances increases viscosity due to crosslinking, further decreasing the oxygen diffusion.

Melt phase conditions can be used to oxidize low density polyethylene. However, some forms of polyethylene, such as high density polyethylene are very difficult to oxidize due to their linear (unbranched) nature and a somewhat higher melting point. U.S. Pat. Nos. 3,332,711 and 5,064,908 both disclose the solid state oxidation of polyethylene in which particulate polyethylene is oxidized in a batch type process using oxygen containing gas and free radical initiator(s). Although the oxidation of polyethylenes that are difficult to oxidize in the melt phase can be conducted on particulate polyethylene according to the processes disclosed in these two patents, the oxidation entails extremely long process residence times.

It would be very desirable to be able to readily oxidize most polyethylenes, including the difficult to oxidize high density polyethylene, in a more rapid manner at reduced costs so as to more readily enable the commercial production of oxidized polyethylene.

SUMMARY

The process for the oxidation of polyethylene according to the present invention comprises continuously introducing free radical initiator, a molecular oxygen containing gas, and particulate polyethylene into a reactor into an agitated bed of particulate oxidized polyethylene at a temperature of at least 65° C. but below the melting temperature of the particulate oxidized polyethylene, while continuously removing particulate oxidized polyethylene product, wherein said particulate oxidized polyethylene in said agitated bed has an acid number of at least 10, and wherein the continuous introduction of particulate polyethylene and continuous removal of particulate oxidized polyethylene product includes, intermittent introduction and removal of quantities of these particulate polyethylenes over time such that no more than 25% of the particles, based on the total of the particulate polyethylenes in said reactor, are unoxidized at any one time.

DETAILED DESCRIPTION OF THE INVENTION

The applicant has unexpectedly discovered an improved process for continuously oxidizing polyethylene in the solid state by continuously or intermittently introducing, in the presence of oxygen and initiators small amounts of particulate polyethylene into an agitated bed of particulate oxidized polyethylene. The applicant has unexpectedly discovered that by the constant introduction of minor amounts of unoxidized polyethylene into a bed of oxidized polyethylene in a reactor, the time required to obtain an oxidized polyethylene of a given acid number is dramatically reduced. Once the bed of oxidized polyethylene is first prepared, the minor amount of fresh unoxidized polyethylene introduced into the bed is unexpectedly oxidized very rapidly as it is continuously introduced. This means that a batch reactor that can oxidize a given amount of particulate polyethylene at any one time would take significantly longer to oxidize larger amounts of particulate polyethylene than a continuous reactor according to the present invention having the same internal capacity. This is clearly illustrated in the present examples.

The process of the present invention entails the continuous introduction of unoxidized particulate polyethylene and the continuous removal of oxidized particulate polyethylene product out of the reactor. The term continuous, due to the particulate nature of the polyethylene, includes the intermittent removal and introduction of quantities of these particulate polyethylenes. Thus, a minor portion of the oxidized polyethylene product is removed out of the reactor to make room for the introduction of a minor amount of unoxidized particulate polyethylene. This intermittent introduction and removal is conducted on a small scale such that at any one time only a minor percent of the bed of particulate oxidized polyethylene is removed and replaced with a minor amount of fresh unoxidized particulate polyethylene. Since the applicant has unexpectedly discovered that a significant amount of oxidized polyethylene particles must be present to facilitate or catalyze the oxidation of unoxidized polyethylene particles, no more than about 25 percent of the particles in the reactor are unoxidized particles of polyethylene. This means that less than 25 percent of the particles present in the reactor at any one time are unoxidized particulate polyethylene. The term unoxidized particulate polyethylene means that these particles of polyethylene are unoxidized or have only been in the reactor a short time such that the surface of the particles have not been oxidized to any significant extent. The amount of unoxidized particulate polyethylene present at any one time in the reactor is preferably less than 20 percent, more preferably less than 10 percent with a percent of unoxidized particulate polyethylene of less than about 5 being most preferred. Higher amounts of unoxidized particulate polyethylene should be avoided since this would dramatically effect rate of oxidation, losing the benefit of the presence of particulate oxidized polyethylene near unoxidized particulate polyethylene. Lower amounts of unoxidized particulate polyethylene present in the reactor means that the rate of oxidation of the polyethylene will increase. However, if this amount is very low, the residence time of the particulate polyethylene in the reactor is significantly increased reducing the effectiveness of the present invention.

The process according to the present invention is preferably conducted in a reactor such that the agitated bed of particulate oxidized polyethylene is a fluidized bed of particulate oxidized polyethylene. This fluidization is preferably conducted using the oxygen containing gas such as air including recycling a portion of this oxygen containing gas. The fluidization or agitation of the bed is important so that the unoxidized particulate polyethylene can be intimately contacted with the particulate oxidized polyethylene to facilitate its oxidation. Although the agitated bed is preferably a fluidized bed of particulate oxidized polyethylene, the unoxidized particulate polyethylene that is introduced is preferably introduced at a point opposite the end of the reactor from which the particulate oxidized polyethylene product is removed. This ensures a minimum residence time of any particulate oxidized polyethylene product such that fresh, unoxidized particulate polyethylene is not removed directly after it is introduced. This amount of particulate oxidized polyethylene product that is removed from one end of the reactor and the amount of particulate polyethylene introduced in the other end is between about 1 and 10 weight percent based on the total particulate polyethylenes present in the reactor. Thus, the total amount of particulate polyethylene present in the reactor remains essentially constant since the removal of oxidized product is replaced by unoxidized polyethylene particles.

The oxygen containing gas used in the process according to the present invention can be any gas or mixture of gases containing molecular oxygen that would oxidize the polyethylene. However, air is preferred due to availability, ease of handling and safety factors. Thus, the process according to the present invention is preferably conducted so that air fluidizes the agitated bed in the present reactor. This preferably entails continuously removing air from one end of the reactor and recycling it into the bed, along with makeup oxygen, to maintain the fluidization of the bed.

The flow of oxygen containing gas required to oxidize the polyethylene according to the present invention and provide fluidization of the agitated bed depends upon the reactor design parameters such as type of diffuser plate, diameter of reactor, cross sectional area and bed weight. In general, the amount of air flow sufficient to fluidize the particulate polyethylene is more than sufficient to supply adequate oxygen to the oxidation reaction.

Suitable examples of reactors useful in the practice of the present invention, include any type of fluidized bed reactor such as disclosed in Encyclopedia of Chemical Technology Vol. 10, p. 548, 3rd Ed. by Kirk-Othmer with the column type fluidized bed reactor being most preferred. The column type of fluidized bed reactor is more preferred due to simplicity of design and ease of operation.

In the process according to the present invention the free radical initiator is preferably selected from the group consisting of peroxides and ozone, with ozone being most preferred. Ozone is preferred due to the ease in which ozone can be introduced from an ozone generator into the oxygen containing gas for use in the agitated bed reactor. Ozone also is very efficient and effective at initializing the oxidation. Suitable peroxides include standard peroxides used in the oxidation of olefins, examples include ditertiary butyl peroxide, tertiary butyl hydroperoxide, cumene hydroperoxide, p-methane peroxide, 2,5-dimethyl-2,5-ditertiary butyl peroxyhexene, and p-menthane hydroperoxide. Azo compounds such as azobis (isobutylonitrile) can also be used.

The amount of ozone present at any one time in the oxygen containing gas present in said reactor is about 0.01 to 5 weight percent, preferably 0.05 to 3 weight percent with a weight percent of about 0.08 to 1.5 being most preferred. At amounts much below 0.01 weight percent the ozone does not significantly initiate the oxidation of polyethylene. Whereas amounts much above 5 weight percent are not needed and not readily practical due to the current inability to generate ozone at such high levels.

The process according to the present invention is conducted at a temperature of at least 65° C. but below the melting temperature of a significant portion of the particulate oxidized polyethylene in the reactor. For the polyethylenes of interest this melting temperature is typically below 130° C. The temperature of the process according to the present invention is preferably about 95° to 125° C. with a temperature of about 105° to 118° C. being most preferred. The upper limit of the process temperature of the present invention is due to the melting point of the polyethylene since molten polyethylene is difficult to oxidize according to the present invention. At process temperatures much below the lower limit, the oxidation is significantly slower than would be practical in a commercial process.

In the process according to the present invention for the oxidation of particulate polyethylene, the particle size of the polyethylene particles are of minor importance. The important feature of particle size has to do with the ability to be readily fluidized in the reactor. The particle size of the particulate polyethylene according to the present invention is preferably about 200 to 2,500 microns. The process according to the present invention can use particulate polyethylene directly from a gas phase synthesis reactor (fluff).

The particulate polyethylene that can be oxidized according to the present invention includes low density, linear low density and high density polyethylenes. Polyethylenes include homopolymers and copolymers of primarily ethylene with butene, hexene, octene, CO, or other monomers known in the art to polymerize with polyethylene. The more preferred polyethylenes include high density polyethylenes due to the difficulty in oxidizing these polyethylenes in the melt phase oxidation processes known in the art. These polyethylenes preferably are homopolyethylenes or copolymers with a percent comonomer content less than 10 weight percent, more preferably less than 2 weight percent.

The process according to the present invention can oxidize the particulate polyethylene to significantly high acid numbers at relatively reduced residence time. The preferred particulate oxidized polyethylene product removed from the reactor has an acid number of at least 10, preferably at least 20 with an acid number of at least 30 being most preferred. Although the higher acid numbers produced according to the present invention are most benefited by the present invention, the particular acid number of the particulate oxidized polyethylene product depends upon the desired product. Generally, the particulate oxidized polyethylene product removed from one end of the reactor is representative of a significant portion of the particulate oxidized polyethylene present in the agitated bed in the reactor.

The following examples are intended to illustrate the present invention without significantly reducing the reasonable scope thereof.

EXAMPLES

Example 1 (Comparative)

The melt phase oxidation of high density polyethylene (HDPE) with a density of 0.967 g/ml and melt index of 9 was attempted in a two liter autoclave heated to 160° C. The HDPE was obtained from British Petroleum as formula HD-6076 AP. When the polymer was molten, air was introduced at 200 psig. However, the HDPE was too viscous to allow the stirrer to turn. No oxidation was possible.

Example 2 (Comparative)

The stirred bed oxidation of the HDPE of Example 1 was conducted in a 2 liter autoclave outfitted with an anchor stirrer and dip pipe for introduction of air and ozone. Thus, 500 grams of HDPE and 125 grams of oxidized HDPE "seed polymer" with a 20 acid number were charged to the autoclave as particles and heated to 115° C. The autoclave was pressured to 5 psi with air and an air and ozone mix containing 2.0 g/hr ozone was allowed to flow through the autoclave at a rate of 1.4 scl/min. After 16 hours an oxidized particulate product with a 30 acid number and viscosity at 190° C. of 10,480 cps was obtained.

Example 3

A fluidized bed reactor with a height of 5 feet and a diameter of 2.5 inches was charged with 800 grams of the same HDPE used in Example 1. The bed was fluidized with a flow of about 15 scl/min of air warmed to 110° C. The skin temperature of the reactor was also maintained at 110° C. An ozone flow of 2.3 g/hr was mixed into the fluidizing air just before the air entered the reactor. After 15 hours the powder had an acid number of 26 and continuous operation started. That is, every 30 minutes 40 grams of HDPE was charged into the bottom of the reactor via a solid sampling stopcock and 40 grams were removed from the top of the column via another solid sampling stopcock. Thus, every 30 minutes, 40 grams of product with a 29.5 acid number and a viscosity at 190° C. of 9,100 cps was produced. Residence time for the production of 29.5 acid number oxidized HDPE was 10 hours. The shorten residence time for continual production of oxidized polyethylene is approximately two thirds the residence time of the batch stirred powder oxidation of comparative Example 2. Thus, by running continuously the reaction time has effectively been decreased by 33 percent.

Example 4

A HDPE with a 0.965 g/ml density and 27 melt index (473,500 cps at 190° C.) obtained from Eastman Chemical Company was oxidized as in Example 3 except the ozone feed was 3.7 g/hr and the fluidizing air flow was 21 scl/minute. Continuous operation at 114° C. with the injection of 50 grams of powder every 30 minutes with subsequent removal of 50 grams of product every 30 minutes gave a product with a 30 acid number and a viscosity at 190° C. of 13,600 cps. The residence time of the powder was 8 hours.

Example 5

The same HDPE material as in Example 4 was oxidized at 105° C. with a air flow rate of 24 scl/min and ozone feed rate of 3.3 g/hr. The total polymer charge to the reactor was 220 grams. Once the acid number of the powder in the bed reached 48, 12 g of HDPE was injected into the bottom of the reactor each hour and product was removed at the rate of 24 grams every two hours. The product had a 58 acid number and a viscosity of 3,800 cps at 190° C. The residence time of the powder was 17 hours. Total production from this run was 780 grams (65 hrs of running).

Example 6

Example 5 was repeated except that the HDPE powder was passed through a 25 mesh sieve to remove larger particles prior to introduction into the fluidized bed reactor. The residence time for the 25 mesh or smaller powder was 14 hours to make a 48 acid number product. Product viscosity was 3300 cp at 190° C.

As can be shown from the above examples, the continuous introduction or incremental introduction of minor amounts of unoxidized polyethylene into a bed of oxidized polyethylene significantly reduces the residence time of the polyethylene to produce oxidized polyethylene of high acid number. High density polyethylene can readily be oxidized to significant acid numbers by this method.

I claim:

1. A process for the oxidation of polyethylene comprising continuously introducing free radical initiator, a molecular oxygen containing gas and particulate polyethylene into a reactor into an agitated bed of particulate oxidizied polyethylene at a temperature of at least 65° C. but below the melting temperature of the particulate oxidizied polyethylene while continuously removing particulate oxidized polyethylene product wherein said particulate oxidized polyethylene in said agitated bed has an acid number of at least 10 and wherein the continuous introduction of particulate polyethylene and continuous removal of particulate oxidized polyethylene product includes, intermittent introduction and removal of quantities of these particulate polyethylenes over time such that no more than 25% of the particles, based on the total of the particulate polyethylenes in said reactor, are unoxidized at any one time.

2. The process according to claim 1 wherein aid continuously introducing of particulate polyethylene and said continuously removing of particulate oxidized polyethylene product are conducted at opposite ends of said reactor.

3. The process according to claim 2 wherein said particulate oxidized polyethylene product is intermittently removed from time to time in an mount of about 1 to 10 weight percent based on the total particulate polyethylenes present in said reactor.

4. The process according to claim 3 wherein an amount of said particulate oxidized polyethylene produce is removed from said reactor just prior to the introduction of said particulate polyethylene such that the amount of the total particulate polyethylene present in the reactor remains about constant.

5. The process according to claim 4 wherein said reactor is a column type fluidized bed reactor.

6. The process according to claim 1 wherein said free radical initiator is selected from the group consisting of peroxide, and ozone.

7. The process according to claim 6 wherein said free radical initiator is ozone.

8. The process according to claim 7 wherein said free radical initiator is ozone present in said oxygen containing gas at a concentration less than 5 weight percent.

9. The process according to claim 1 wherein said molecular oxygen containing gas is air.

10. The process according to claim 9 wherein said air is passed through the bed of particulate oxidized polyethylene at a rate such that said bed is fluidized.

11. The process according to claim 10 wherein said air is continuously removed out of said reactor and is recycled and reintroduced into said bed along with makeup oxygen to maintain the fluidization of said bed.

12. The process according to claim 1 wherein said temperature is about 95° to 125° C.

13. The process according to claim 12 wherein said temperature is about 105° to 118° C.

14. The process according to claim 1 wherein said particulate polyethylene introduced into said reactor has an average particle size of about 200 microns to 2,500 microns.

15. The process according to claim 1 wherein said particulate polyethylene is high density polyethylene.

16. The process according to claim 1 wherein said particulate oxidized polyethylene product removed from said reactor has an acid number of at least 10.

17. The process according to claim 16 wherein said particulate oxidized polyethylene product has an acid number of at least 20.

18. The process according to claim 1 wherein said particulate oxidized polyethylene product has an acid number of at least 30.

19. The process according to claim 1 wherein the percent of said particles in said reactor that are unoxidized is no more than about 20.

20. The process according to claim 19 wherein the percent of said particles in said reactor that are unoxidized are less than 10.

21. The process according to claim 1 wherein said particulate polyethylene introduced into said reactor comes from the gas phase polyethylene polymerization reactor in the form of polyethylene particles.

* * * * *

UNITED STATES PATENT AND TRADEMARK OFFICE
CERTIFICATE OF CORRECTION

PATENT NO. : 5,401,811
DATED : March 28, 1995
INVENTOR(S) : Richard K. Stuart, Jr.

It is certified that error appears in the above-indentified patent and that said Letters Patent is hereby corrected as shown below:

Column 6, line 45 insert - - -s- - - after wherein and before aid.

Column 6, line 52 before mount insert - - -a- - -.

Column 6, line 57 delete duce and insert - - -duct- - -.

Signed and Sealed this

Fifteenth Day of August, 1995

Attest:

BRUCE LEHMAN

*Attesting Officer*  *Commissioner of Patents and Trademarks*